United States Patent [19]

Marincic et al.

[11] Patent Number: 5,107,599
[45] Date of Patent: Apr. 28, 1992

[54] UNIVERSAL FIXTURE FOR COORDINATE MEASURING MACHINES

[75] Inventors: Robert J. Marincic; William F. Marincic, both of N. Huntingdon, Pa.

[73] Assignee: General Motors Corporation, Detroit, Mich.

[21] Appl. No.: 574,344

[22] Filed: Aug. 28, 1990

[51] Int. Cl.⁵ .............................. G01B 21/20
[52] U.S. Cl. ........................ 33/573; 269/45; 269/309; 269/900
[58] Field of Search ............... 33/568, 573; 269/400, 269/309, 310, 9, 10, 45, 311, 305, 319, 40

[56] References Cited

U.S. PATENT DOCUMENTS

| | | |
|---|---|---|
| 3,175,820 | 3/1965 | Schiler ........................ 269/309 |
| 3,188,078 | 6/1965 | Petersen ...................... 269/305 |
| 3,563,124 | 2/1971 | Gargave ........................ 83/698 |
| 3,606,300 | 9/1971 | Davis .......................... 269/309 |
| 3,848,495 | 11/1974 | Youra ......................... 269/305 |
| 4,085,887 | 2/1984 | Ray ............................ 269/21 |
| 4,500,079 | 2/1985 | Morghen ...................... 269/309 |
| 4,593,804 | 6/1986 | Kinsey et al. ................ 269/900 |
| 4,834,358 | 5/1989 | Okolischan et al. ........... 269/900 |
| 5,005,814 | 4/1991 | Gumbert ...................... 269/900 |
| 5,026,033 | 7/1991 | Roxy .......................... 269/45 |

FOREIGN PATENT DOCUMENTS 2523492  9/1983  France ........................... 269/900

Primary Examiner—Thomas B. Will
Attorney, Agent, or Firm—Patrick M. Griffin

[57] ABSTRACT

A universal part holding fixture for a CMM uses a plurality of ball detent retainers bolted to a base plate to allow part holders to be set up and removed with improved speed and accuracy.

2 Claims, 5 Drawing Sheets

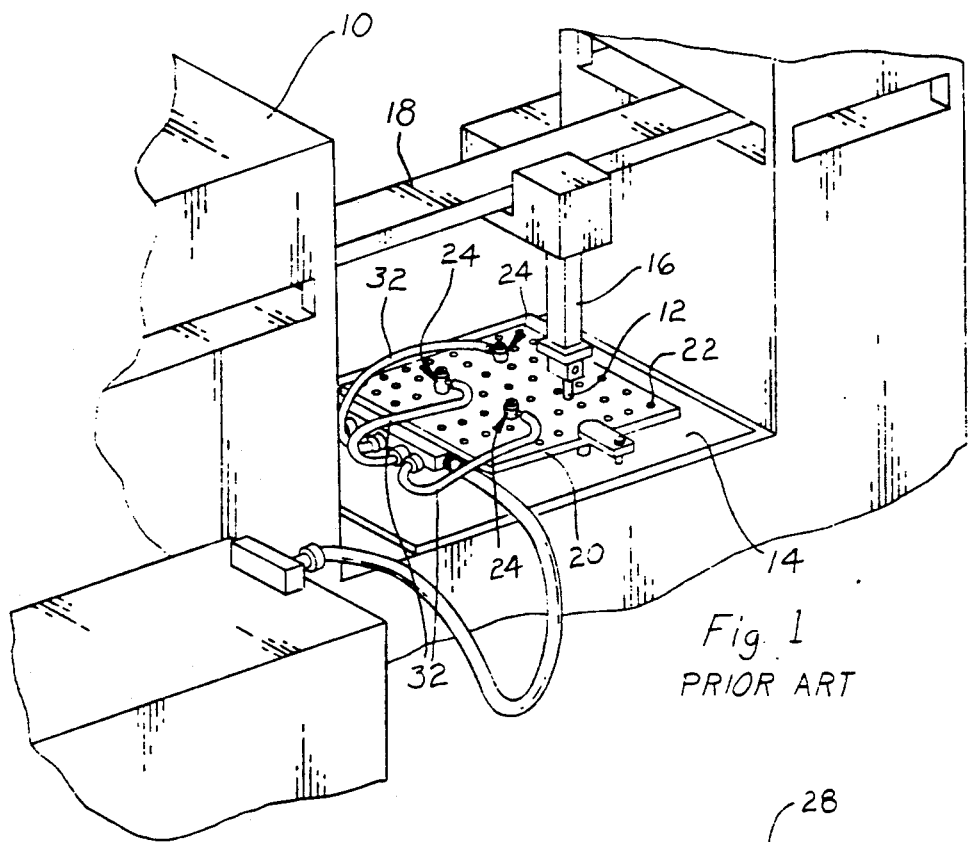
Fig. 1
PRIOR ART
Fig 2
PRIOR ART
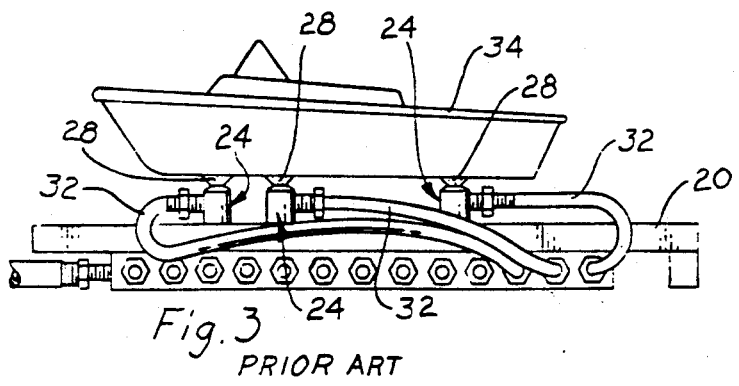
Fig. 3
PRIOR ART

UNIVERSAL FIXTURE FOR COORDINATE MEASURING MACHINES

This invention relates to fixtures for holding parts for coordinate measuring machines in general, and specifically to a universal fixture for such a machine in which the various rests and clamps that hold the part can be set up with improved speed, accuracy and repeatability.

BACKGROUND OF THE INVENTION

Coordinate measuring machines, generally referred to as CMM's, are by now a well known means of checking the accuracy of manufactured parts, such as stamped sheet metal body panels for automobiles. With CMM's, some kind of fixture is needed to hold the part to be checked in a known orientation, one which presents the part in a fixed reference frame accurate in all three axes. Ideally, the fixture would hold the part with sufficient accuracy that the part could be read immediately. That is, if the fixture were accurate enough per se, it would not be necessary to take initial readings on the part to establish the origin of the part. However, that level of accuracy is not available with some current systems.

One option is the so called "hard" or dedicated fixtures. A dedicated fixture is a large, solid, heavy part that is unique to the panel to be measured, just as the die that makes the panel is unique to the panel. Although accurate, a hard fixture is expensive to make and store. More troublesome than initial cost, in the current climate of flexible manufacturing and the imperative toward ever more rapid die changes, is the time involved just in finding and setting up a dedicated fixture.

So called universal fixtures accommodate several different parts. A heavy foundation or base has a peg board grid of drilled holes in which various clamps or holders can be removably mounted. Part holders are placed at as many locations on the base as necessary to support any particular part. The base is fixed accurately relative to the CMM and, if the part holders are also fixed accurately relative to the base, the net effect is that the part is fixed accurately relative to the CMM. Not only is it critical that the part holders be secured accurately relative to the base, it is also important that the part holders be capable of quick and easy set up on and removal from the base, so that the different parts to be measured can be fixtured quickly.

Known universal fixtures fall short of these goals. One well known universal fixtures uses a number of vacuum cups threaded into drilled holes in a plate. These pull down on the underside of the part to support it. A vacuum suction cup, being flat and flexible in the vertical direction, cannot fix an absolutely accurate lateral or vertical position of the supported part, as is described in more detail below. As a consequence, it is recommended that parts fixtured by the vacuum type of device be initially read to establish part origin, rather than trusting the fixture alone for accuracy. Other universal fixtures use the same type of base with drilled threaded holes, but use purely mechanical clamps and supports, avoiding the inevitable inaccuracies inherent in the flexible vacuum cup system. Such clamps are secured to the base by multiple threaded bolts. Changing the part to be measured generally requires that each clamp be removed and replaced with another, in turn requiring that each bolt be removed and replaced with another in a different location. This is obviously slower than just unthreading and moving a single vacuum cup.

SUMMARY OF THE INVENTION

The invention provides a universal fixture that is quick and easy to set up, and yet comparable in accuracy to a dedicated fixture.

The preferred embodiment of the invention is used with a commercially available CMM to check large stamped sheet metal parts for conformity. A heavy metal base with a regular pattern of drilled mounting holes is fixed relative to the CMM. A series of part holders, including lateral stops, vertical supports, and clamps are uniquely designed to hold a particular part to be measured. The various holders are all assigned to particular mounting points on the base such that, if they are accurately secured to those assigned points, they will accurately support the part for measurement. Quick, accurate and repeatable mounting of the part holders to their assigned points on the base plate is achieved through the use of standardized ball detent retainers that are bolted to the plate at each assigned mounting point. Standardized grooves machined into mounting posts of the part holders interfit with the ball detent retainers very precisely, orienting the holders strictly in all three axes. The fixture so created is precise enough that the part can be supported and measured as is, without doing any initial measurements to justify the part to the CMM. Afterward, the part holders can be quickly removed, stored, and replaced with others to measure a new part.

It is, therefore, an object of the invention to provide a universal CMM fixture with an accuracy comparable to a dedicated fixture.

It is another object of the invention to provide a universal CMM fixture with improved accuracy, set up time, and cost.

It is another object of the invention provide such a universal CMM fixture in which the part holders can be precisely, quickly and repeatably located through the use of standardized spring loaded ball type retainers.

It is another object of the invention to provide a method of designing and building such an improved universal fixture.

DESCRIPTION OF THE PREFERRED EMBODIMENT

These and other objects and features of the invention will appear from the following written description, and from the drawings, in which:

FIG. 1 is a perspective view of a typical CMM and the prior art vacuum cup type of fixture referred to above;

FIG. 2 is view of a prior art vacuum cup alone;

FIG. 3 is a view of a part supported by the prior art fixture of FIG. 1;

Figure 4:
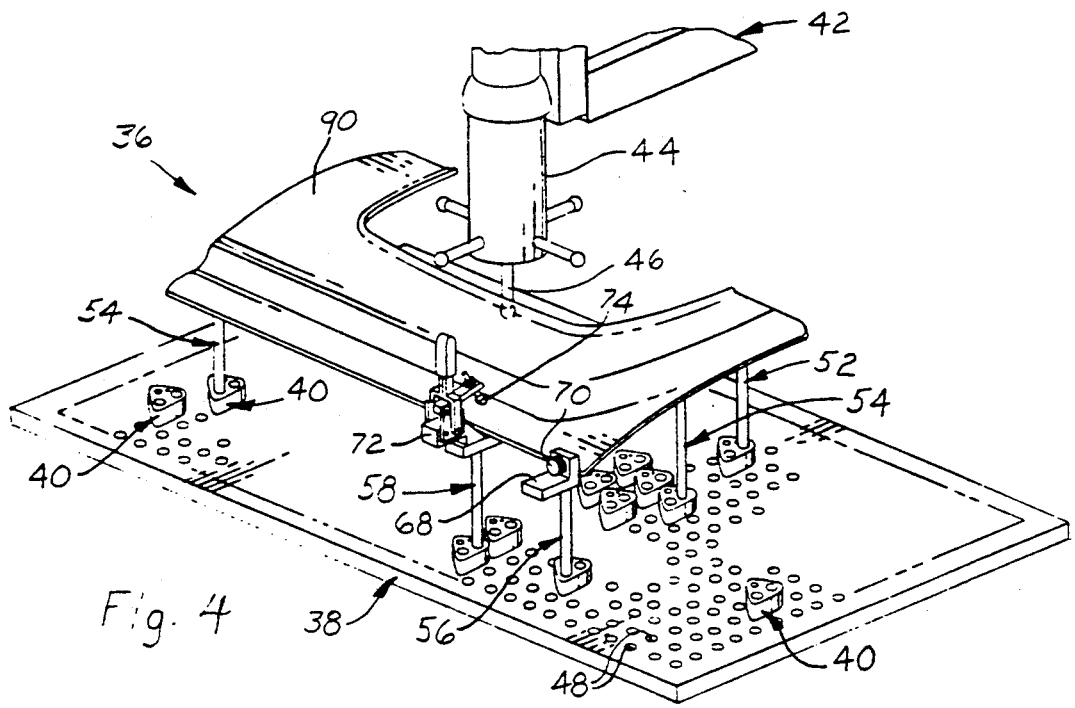
FIG. 4 is a perspective view of a preferred embodiment of the improved universal fixture of the invention supporting a part.

Referring first to FIGS. 1-3, a typical CMM machine 10 has a contact probe 12 adapted to contact a test part and measure it relative to a reference frame embedded in the program of the CMM's computer. A rigid bed 14 is fixed relative to the CMM, and is immobile relative to a probe supporting arm 16 and a beam 18 on which arm 16 moves. A prior art vacuum cup type of universal fixture includes a plate 20 fixed to bed 14, with a grid of threaded holes 22 tapped into it. Each of a series of vacuum cups, one of which is indicated generally at 24, has a threaded stem 26 at the bottom, a flexible skirt 28 at the top, and a vacuum hose fitting 30 on the side. A plurality of cups 24 are threaded into plate 20, and vacuum hoses 32 attached to fittings 30. Then, a part 34 to be measured is set down on the flexible skirts 28, and vacuum applied to pull it down. Clearly, part 34 can be quickly set down on and picked up from the cups 24, and a cup 24 can easily be moved from one hole 22 to another, assuming that cup 24 is of a standard height.

The shortcomings noted above may be clearly seen. The skirts 28, being of a standard height and flat, can pull down only on a suitably flat under surface of part 34 at their standard height, although they can give to a certain extent to conform to an under surface of part 34 that is not absolutely flat. While different height cups 24 could be used, they could not then be moved interchangeably. While the skirts 28 could, presumably, be made curved or slanted, rather than flat, so as to match a curved or slanted surface of part 34, they would not then be interchangeable. Also, a preferred angular position of cup 24 relative to plate 20 would be required, if skirt 28 were slanted. A threaded connection like stem 26 cannot establish an angular position very accurately, and would depend on the tightness with which it was threaded in. Even if flat and standardized in height, the skirts 28, being flexible, cannot by themselves establish a vertical position for part 34 nearly as accurately as a rigid clamp, nor can the cups 24 together establish a fixed lateral position for part 34 relative to plate 20. Consequently, makers of vacuum fixtures recommend that the part 34, once it is drawn down on cups 24, be initially probed to establish its position, rather than relying on the fixture itself.

Referring next to FIG. 4, a preferred embodiment of the universal fixture of the invention is indicated generally at 36. Fixture 36 is purely mechanical, using no vacuum. The basic components of fixture 36 are a rigid base, indicated generally at 38, a series of various article holders, described in more detail below, and a plurality of retainers, indicated generally at 40. Fixture 36 is used with a CMM, indicated generally at 42 which is similar to the CMM 10 described above. CMM 42 is what is known as the cantilever arm type, having an arm 44 and probe 46. The details of how a machine like CMM 42 operates are well known, and are not repeated here. CMM 42 has a master coordinate system, or MCS, programmed into it, which represents an established reference frame. If a part to be measured can be fixed in a known position relative to that established reference frame, then it can be measured. This is what fixture 36 is adapted to do, and to do for any number of parts. Details of the basic components are described next.

Figure 5:
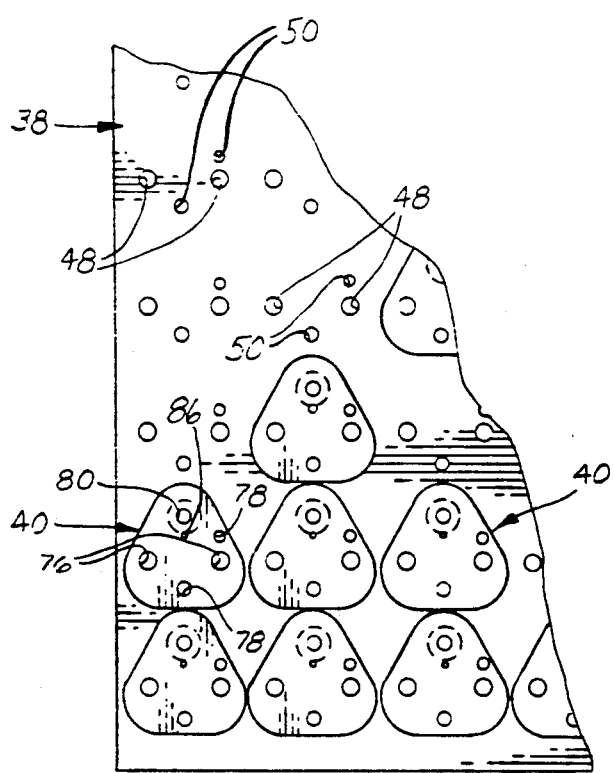
FIG. 5 is a partially schematic view of the base of the invention.
Figure 6:
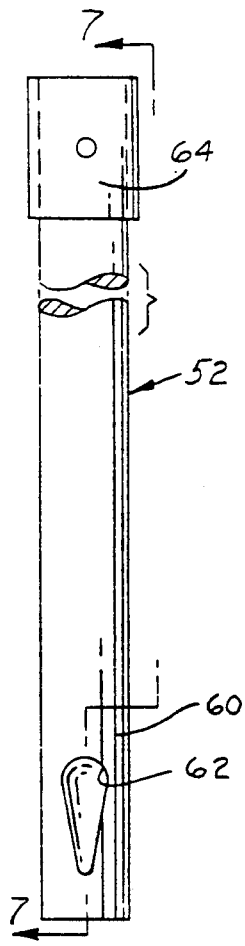
FIG. 6 is a front view of a lateral stop.
Figure 7:
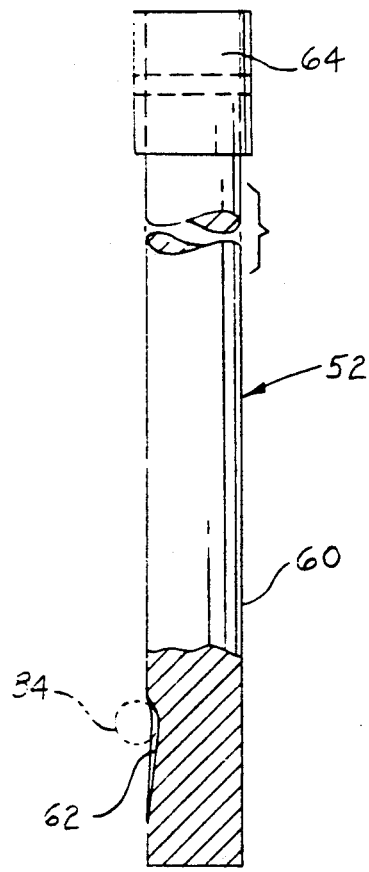
FIG. 7 is a side view of a lateral stop.
Figure 9:
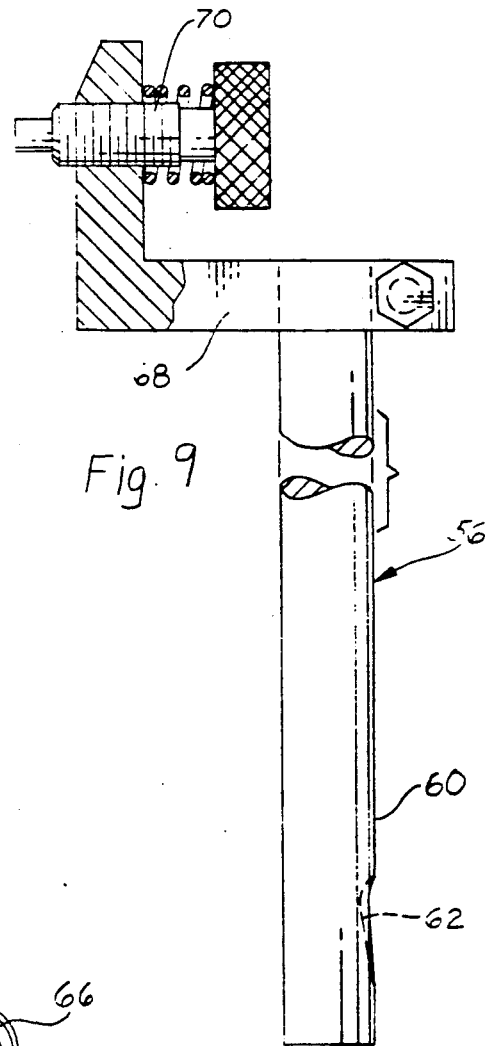
FIG. 9 is a side view of a clamp.
Figure 8:
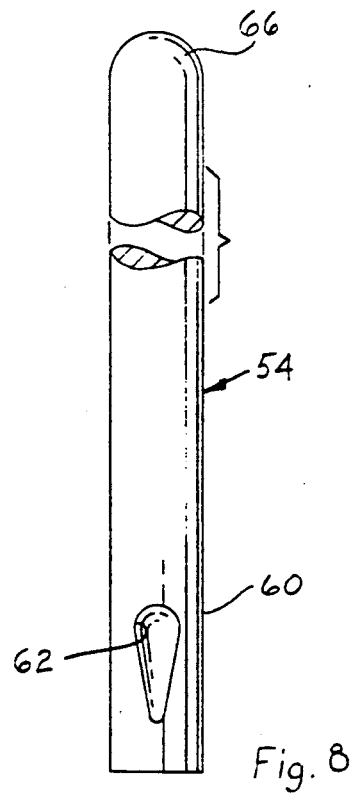
FIG. 8 is a front view of a vertical support.

Referring next to FIG. 5, base 38 is a heavy, rectangular aluminum plate drilled with a regular, repeating hole pattern. In the embodiment disclosed, the hole pattern consists of a repeating pattern of four holes, two threaded holes 48, and two non threaded dowel holes 50. There are sixteen rows and thirty six columns, or 256 sets altogether. The imaginary center of each set of four holes is 55 mm in each direction from the next, which allows the retainers 40 to be mounted to base 38 in close packed fashion, as described in detail below. The number and size of the holes 48 and 50 are not critical as such, but are determined so as to match holes in the retainers 40, and would vary as the retainer 40 did. Nor is the number of rows and columns critical, but would vary with how large a base 38 was needed to accommodate the various parts to be measured. The machinist who prepared base 38 would first determine how many and what size holes were needed to mount a given retainer like 40, how large a base 38 was needed to accommodate the expected part size range, and then determine the center to center measurement for a hole pattern that would allow the necessary number of retainers 40 to be bolted to base 38. As a practical matter, the designer would probably want to provide for a close packed, shoulder to shoulder array of retainers 40, as many as could be fitted onto base 38, although that, too, is not crucial. What is important is that each set of four holes 48 and 50 be at a known, precise location. In the embodiment disclosed, this is assured, since the sets of holes are arrayed in a regular, repeating pattern, which can be drilled with a great deal of accuracy. The hole pattern provided represents mounting points for a series of part holders, described in detail next.

Referring next to FIGS. 6 through 10, a series of part holders include lateral stops, indicated generally at 52, vertical supports, indicated generally at 54, clamps, indicated generally at 56, and combination supports and clamps, indicated generally at 58. Each part holder serves a different function in supporting a part, but each has a standardized cylindrical mounting post 60, a straight, cylindrical steel rod that comprises the main body of each part holder. Machined into each mounting post 60 is a tear drop shaped ball engaging groove 62, which has a spherical upper end with a diameter of about 5/16 of an inch. The center point of the spherical groove end is about one inch above the lower end of the mounting post 60, and it has a greatest depth of about one tenth of an inch. Since the mounting posts 60 and grooves 62 are uniform, with a standard shape, size and relative location for all of the part holders, they are described by the same number for all part holders.

Referring to FIGS. 6 through 12, the unique features of each part holder are described, as well as the general method of their manufacture. Lateral stop 52 is basically just a cylindrical rod, with a short bushing or sleeve 64 screwed to the top of its mounting post 60. Vertical support 54 is even simpler, being a cylindrical rod with a rounded upper end 66. Clamp 56 has an L shaped bracket 68 screwed to the top of its post 60, which mounts a spring loaded plunger 70. Combination clamp and support 58 has an L shaped leg 72 screwed down near the top of its post 60, which also mounts a swinging jaw 74 that can be tightened down against leg 72. Each part holder is uniquely tailored to each part to be supported, so no specific sizes and shapes are given, other than the standardized mounting post 60. Each part holder would have its mounting post 60 assigned to a mounting point on base 38 below or near some chosen spot on the part to be supported, such as an edge or a spot in the interior of a large panel. Then, the part engaging portion of each part holder would be set to a location and height suitable to support that spot on the panel. For example, bracket 68 of clamp 56 would be moved up or down on mounting post 60 to the correct height to press against a part to be supported, and then tightened down permanently. The same would be done for leg 72 of combination clamp and support 58, and so on.

Figures 10, 11:
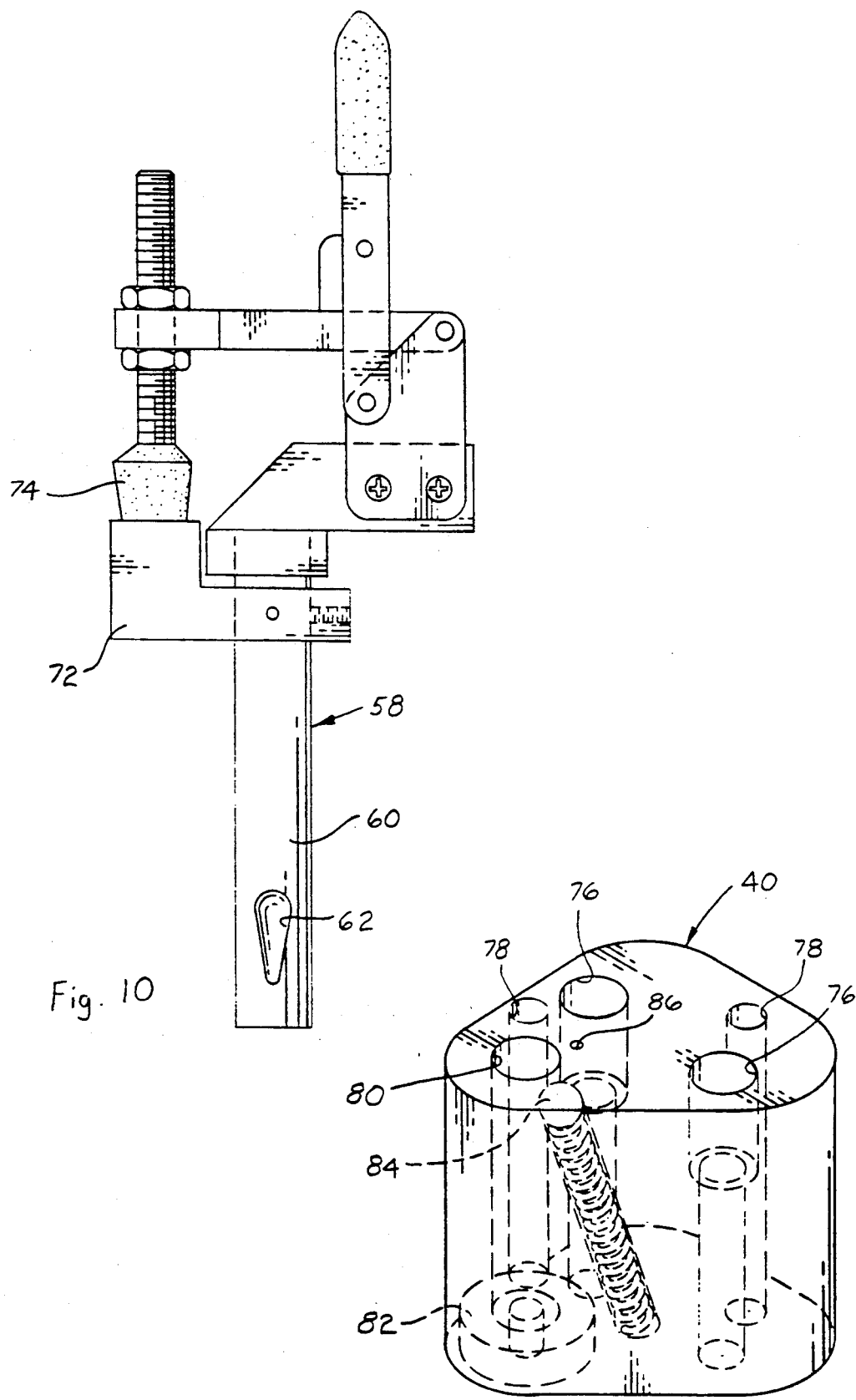
FIG. 10 is a front view of a combination support and clamp.
FIG. 11 is a perspective view of a retainer.

Referring next to FIG. 11, the details of retainer 40 are shown. Each retainer 40 has a generally triangular solid steel body through which are drilled a pair of stepped bolt holes 76 and a pair of smooth, cylindrical alignment holes 78. The bolt holes match the threaded holes 48 in base 38, and the alignment holes 78 match the dowel holes 50. At the apex of the triangular body is a passage adapted to closely receive a mounting post 60, a precisely drilled, cylindrical and vertical post hole 80, with a diameter substantially the same as that of a mounting post 60. A pad 82 sits at the bottom of post hole 80. A side passage drilled into post hole 80 contains a spring loaded ball detent 84, which is normally pushed up and partially into post hole 80. The diameter of ball detent 84 is substantially equal to, and thereby adapted to seat securely in, the spherical upper end of a ball engaging groove 62. A pin hole 86 provides access to ball detent 84 so that it can be manually pushed down and out of post hole 80 by a slender tool or wire. A retainer 40 would be bolted to base 38 at every mounting point where a part holder would potentially be needed. The desired mounting points on base 38 could be called out in any convenient manner, such as by unique numbers or codes. Or, a mounting point could be called out by column and row, like points on a road map. It is unlikely, though possible, that a retainer 40 would be bolted to every possible point on base 38. Once bolted in place, retainer 40 would not have to be moved again, unlike conventional fixtures. Once bolted in place, the post hole 80 and ball detent 84 represent a standardized, highly accurate potential juncture between any part holder post 60 and base 38. Post hole 80 is rigorously square to base 38, and detent 84 rests at an accurate, standard height above the surface of base 38. With retainers 40 in place, the part holders can be manufactured as described above.

Figure 12:
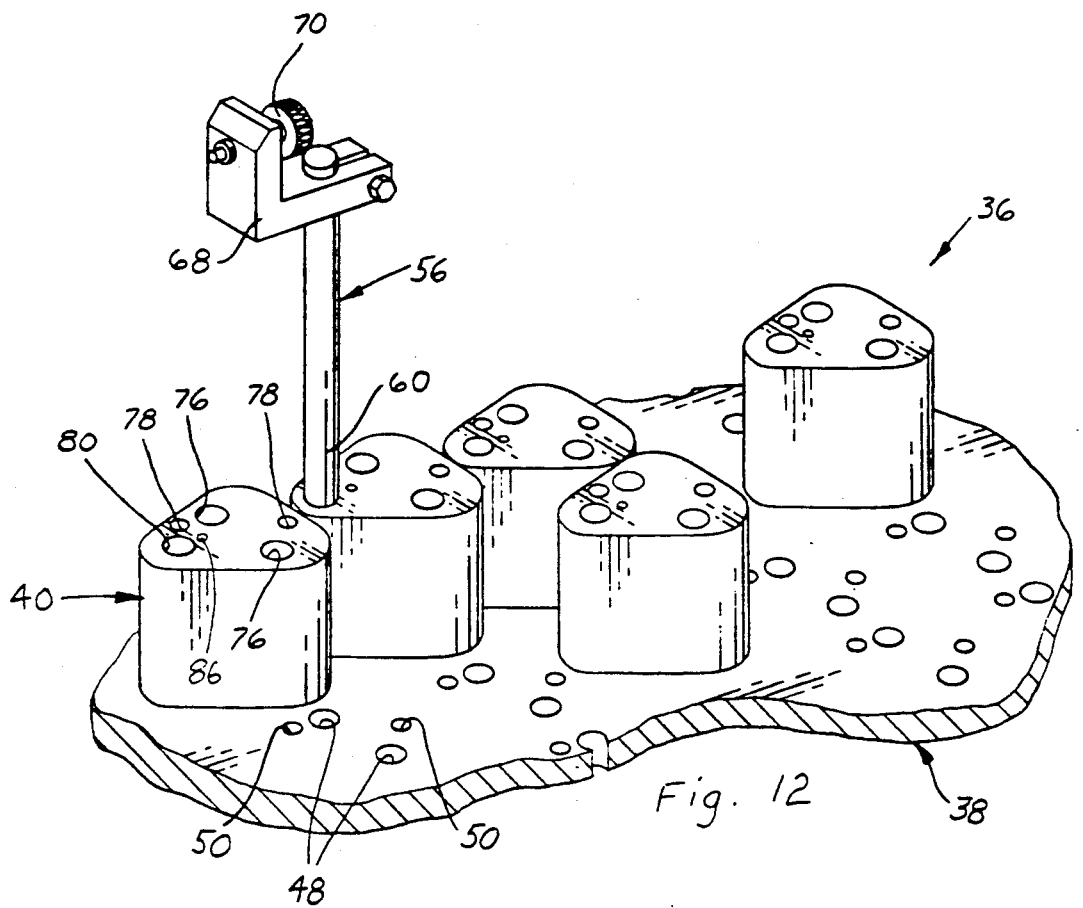
FIG. 12 is a perspective view of part of the fixture of the invention showing a clamp.
Figure 13:
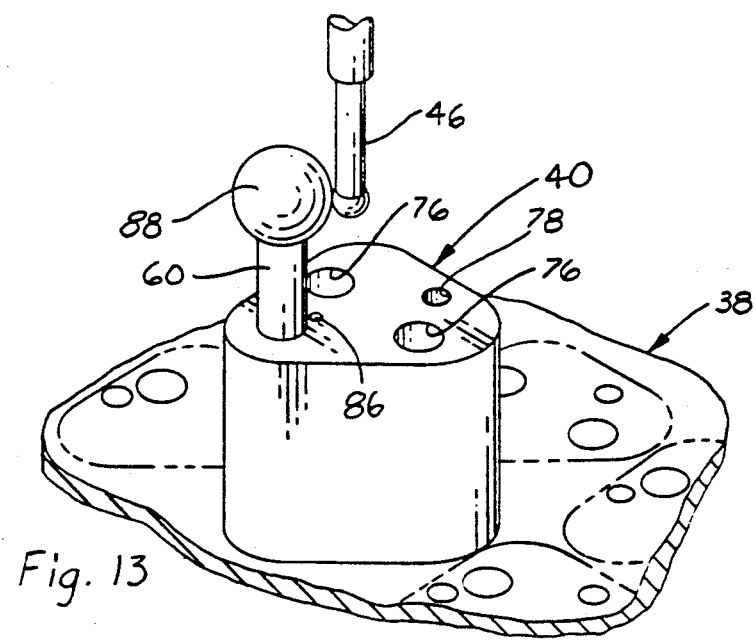
FIG. 13 is a perspective view showing a coordinate locating ball on the fixture being probed.

Referring next to FIG. 12 and 13, the set up of fixture 36 is described. Once base 38 has been drilled, it is aligned and squared up relative to CMM 42, then fixed in place by any suitable means. Next, a standard sphere 88, known as a work organization sphere, is attached to base 38, as shown in FIG. 13. Sphere 88, which is a one inch, accurately machined ball, also has a mounting post 60 so that it can be inserted in a retainer 40 out at the corner of base 38. Sphere 88 is then measured by probe 46 to determine its center, the coordinates of which have a known position relative to the base 38. Since sphere 88 is fixed relative to base 38 and CMM 42, the computer program can be designed to mathematically translate and relate any point that has a known relation to the center of sphere 88 to the MCS. Once base 38 is affixed and probed, the retainers 40 may then be bolted onto base 38, or, more likely, will already have been added. It is now a simple matter to add each part holder to its assigned mounting point on base 38, that is, to its respective retainer 40. A part holder is mounted simply by inserting a mounting post 60 into a retainer post hole 80 and turning it until ball detent 84 engages groove 62. Ball detent 84 resiliently seats itself closely in the spherical upper end of groove 62, with the lower end of post 60 resting on pad 82. The accuracy of the various part holders is assured. For example, with clamp 56, its lateral position on base 38 is determined by the accurate lateral positioning of its respective retainer 40. The vertical position of bracket 68 is determined by the standard height of ball detent 84 and by the lower end of post 60 resting on pad 82. Post 60 is held square by its close fit in post hole 80, and the angular position of bracket 68 is determined by the ball detent 84 and groove 62. The part holders can be added and removed far more quickly that even the vacuum cups described above. To remove any part holder, a probe is simply pushed down pin hole 86 to push ball detent 84 out of groove 62, and post 60 pulled out. There is no time consuming, inaccurate threading or unthreading involved, since the retainers 40 are left in place. All the part holders can be stored loose in a small box and stored on a shelf in very little volume. Adding and removing the part holders can literally be done in as few as three or four minutes in most cases.

Referring next to FIG. 4, a part to be tested, such as a large body panel 90, may now be supported and probed. Body panel 90 is supported with excellent accuracy, because the part holders are. Unlike the vacuum cup type of fixture, the position of panel 90 can be rigorously held in all directions. For example, the plunger 70 of clamp 56 can be used to apply lateral pressure to panel 90 to load it directly or indirectly against a the side of sleeve 64 of lateral stop 52. Vertical supports 54 can support an under surface of panel 90 with essentially no give, unlike a flexible vacuum cup. The combination clamp and support 58 can grip an edge of panel 90 between its leg 72 and jaw 74, rigorously determining both height and lateral position. Because of that guaranteed accuracy, panel 90 can be measured right away, without initially probing it to relate it to the MCS, as is needed with the vacuum cup type of fixture. The initial probing of sphere 88 is all that is needed. In effect, panel 90 is supported with the same basic accuracy as a "hard" or dedicated fixture, and certainly as accurately as the mechanical type of universal fixture described above. For example, in what was previously considered a good standard of accuracy, three different operators measuring five different panels like 90 would not exceed 30% of the tolerance band. With the fixture 36 disclosed, that has been reduced to 9.5%. Flexibility, set up speed, accuracy, and cost have all been improved.

Variations of the embodiment disclosed could be made. For example, a regular, graph paper grid of mounting points would not have to be drilled on base 38 just to achieve the set up speed and accuracy described. That is, the retainers 40 necessary for supporting a given number of parts could be bolted to a base in what would appear to be an irregular, but still accurately predetermined, number of mounting points, only as many as necessary to mount the needed part holders. The base would be otherwise free of holes, unlike base 38. Such a fixture would still be universal in the sense that it would quickly and accurately accommodate more than one part, but would not be capable of accommodating as great a number of retainers 40 as base 38. Base 38 could be supported other than horizontally, even vertically if desired. The part holders need not have mounting posts that are completely straight, so long as much of post 60 as needed to insert into post hole 80 is straight. A fixture like 36 could be used to support a part to be measured by any kind of measuring device. Fixture 36 could even be used to support a part in a fixed relation to an established reference frame for a purpose other than measurement, such as for finishing. Therefore, it will be understood that it is not intended to limit the invention to just the embodiment disclosed.

The embodiments of the invention in which an exclusive property or privilege is claimed are defined as follows:

1. A universal fixture to support a part relative to an established reference frame, comprising, a base fixed relative to said reference frame, a pattern of mounting points established on said base, a plurality of part holders adapted to hold said part securely relative to said established reference frame when fixed accurately to said base at a predetermined number of said mounting points, each of said part holders having a unitary mounting post with a part supporting upper portion, a straight rod lower portion, and a ball engaging groove located at a uniform position and height above the lower end of said straight rod lower portion, and, a plurality of standard retainers, each affixed to said base at said predetermined mounting points, each retainer having a passage adapted to closely receive said mounting post, a pad at the bottom of said passage, and a releasable spring biased ball located at said predetermined height above said pad, whereby, said part holders may be accurately fixed to said base by inserting said mounting post straight rod lower portions into said retainer passages until said lower ends seat on said pads and said balls engage said grooves, thereby allowing the weight of said part to be supported above said base in a known position relative to said established reference frame.

2. A universal fixture to support a part relative to an established reference frame, comprising, a base fixed relative to said reference frame, a regular pattern of mounting points established on said base, a plurality of part holders adapted to hold said part securely relative to said established reference frame when fixed accurately to said base at a predetermined number of said mounting points, each of said part holders having a unitary mounting post with a part supporting upper portion, a straight rod lower portion, and a ball engaging groove located at a uniform position and height above the lower end of said straight rod lower portion, and, a plurality of standard retainers, each affixed to said base at predetermined ones of said regular pattern of mounting points, each retainer having a passage adapted to closely receive said mounting post, a pad at the bottom of said passage, and a releasable spring biased ball located at said predetermined height above said pad, whereby, said part holders may be accurately fixed to said base by inserting said mounting post straight rod lower portions into said retainer passages until said lower ends seat on said pads and said balls engage said grooves, thereby allowing the weight of said part to be supported above said base in a known position relative to said established reference frame.

* * * * *